(12) United States Patent  (10) Patent No.: US 7,503,602 B1
Hinton  (45) Date of Patent: Mar. 17, 2009

(54) ENERGY ABSORBING BUMPER

(76) Inventor: Golden Hinton, 408 Springdale St., #1, Athens, GA (US) 30606

( * ) Notice: Subject to any disclaimer, the term of this patent is extended or adjusted under 35 U.S.C. 154(b) by 0 days.

(21) Appl. No.: 12/180,281

(22) Filed: Jul. 25, 2008

(51) Int. Cl.
B60R 7/00 (2006.01)
(52) U.S. Cl. .................. 293/124; 296/187.03; 267/139
(58) Field of Classification Search ................ 293/124, 293/135, 136, 137; 296/187.03, 187.04, 296/187.09, 187.12; 267/139
See application file for complete search history.

(56) References Cited

U.S. PATENT DOCUMENTS

| | | | |
|---|---|---|---|
| 3,130,998 | A | 4/1964 | Anderson |
| 3,721,433 | A | 3/1973 | Sobel |
| 3,841,683 | A | 10/1974 | Toro |
| 4,082,338 | A | 4/1978 | Hutai et al. |
| 4,254,978 | A | 3/1981 | Eshelman |
| 4,413,856 | A | 11/1983 | McMahan et al. |
| 4,592,580 | A | 6/1986 | Stanganelli et al. |
| 4,889,374 | A | 12/1989 | Choun |
| 5,141,279 | A * | 8/1992 | Weller ..................... 296/146.7 |
| 5,876,078 | A | 3/1999 | Miskech et al. |
| 6,050,624 | A | 4/2000 | Kim |
| 2005/0196322 | A1 | 9/2005 | Vijay et al. |
| 2007/0151819 | A1 | 7/2007 | Schmidt et al. |

* cited by examiner

Primary Examiner—Joseph D Pape
(74) Attorney, Agent, or Firm—Quick Patents, Inc.; Kevin Prince

(57) ABSTRACT

A bumper for a vehicle is disclosed. The bumper includes a housing that has a pair of interlocking supporting frames. One of the supporting frames is fixed to the vehicle body. The bumper includes a plurality of rebounding elements and a plurality of biasing elements, each that are fixed within one of the supporting frames of the housing. Each of the rebounding elements has a predetermined rebounding elements spring coefficient. The plurality of biasing elements has a biasing elements spring coefficient that is not equal to, and is preferably less than, the spring coefficient of each rebounding element. Further, each of the biasing elements abuts one of the rebounding elements. As such, as the interlocking supporting frames of the housing are compressed in a vehicle collision, the plurality of rebounding elements together with the plurality of biasing elements absorb the collision energy and are each compressed at different rates.

8 Claims, 4 Drawing Sheets

ENERGY ABSORBING BUMPER

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to impact absorbers, and more particularly to a bumper for a vehicle that absorbs both light and heavy impacts and compresses at differing rates with each.

DISCUSSION OF RELATED ART

With the increased risk of accidents on the road, it is often desirable to have an impact absorber on a vehicle. An impact upon an automotive vehicle can be quite traumatic, both to the occupants and to the vehicle's structural integrity. The impact absorber like bumpers can be fixed at different locations on the vehicle. For example, the bumpers are usually a more or less rigid metal bar or flexible springs and rubbers. However, such bumpers have considerable drawbacks. They are generally compressed for optimized energy absorption stroke, complex in construction and difficult to build and service. Additionally, some of the absorbers add undesired weight to the vehicle.

Several prior arts devices are known to provide impact absorbers with multiple means for compression. For example, U.S. Pat. No. 3,130,998 to Andersen on Apr. 28, 1964 provides a rubber bumper for automobiles. Such a device employs rubber strips on front and rear bumpers but has poor energy absorbing qualities and provides little or no prohibition during collision at high speeds. Furthermore, such a device expands rapidly after impact, causing the vehicle to recoil or bounce back in a possibly undesirable fashion.

U.S. Pat. No. 3,361,467 to Ludwikowshi on Jan. 2, 1968 discloses a single stage spring and rubber shock absorber means for a vehicle bumper. There is no support structure for the device and results in vibrations and rattles. Only minor impacts can be absorbed by such a bumper.

U.S. Pat. No. 3,843,180 to Alexander on Oct. 22, 1974 discloses a safety-type bumper for use on motor vehicles, such as trucks, which is characterized by having complementary spring biased end sections pivotally or hinged mounted on the respective ends of the main body of the bumper. This construction is also costly and complicated and light impacts are absorbed by the spring-biased ends.

U.S. Pat. No. 7,097,222 to Ran on Aug. 29, 2006 discloses an anti-crash safety device that is characterized by having a bumper and a shock absorber. Such a device is limited to low speed slight collision since it is provided with an elongated spring system. The spring system cause small oscillations of the vehicle body which is uncomfortable for the driver.

Therefore, there is a need for a bumper device that provides an impact-absorbing system for slight, moderate and severe impact forces. Further, such impact-absorbing bumper would need to be provided in a safe manner with supporting frames and would not require complicated construction. Such a needed device would protect a vehicle and occupants in a vehicle collision. Moreover, such a device would use a minimum of components, have a low cost of manufacturing, and be easy to fix at different location on a vehicle with simple configuration steps. The present invention accomplishes these objectives.

SUMMARY OF THE INVENTION

The present device is a bumper for a vehicle, such as a car, truck, trailer, or the like, that may be fixed at different locations on the vehicle. The bumper includes a housing that has a pair of interlocking supporting frames. One of the supporting frames is fixed to the vehicle body. The bumper includes a plurality of rebounding means and a plurality of biasing means, each that are each fixed within one of the supporting frames of the housing. Each of the rebounding means has a predetermined rebounding means spring coefficient.

The plurality of biasing means has a biasing means spring coefficient that is not equal to, and is preferably less than, the rebounding means spring coefficient. Further, each of the biasing means abuts one of the rebounding means. As such, as the interlocking supporting frames of the housing are compressed in a vehicle collision, the plurality of rebounding means together with the plurality of biasing means absorb the collision energy and are each compressed at different rates. Light impacts can be absorbed by the plurality of biasing means, but in a serious collision both, the rebounding means and the biasing means absorb the collision impact energy.

The present invention facilitates absorption of slight, moderate and severe impact forces and compresses at differing force rates as needed. Further, such an impact-absorbing bumper is safe, and with supporting frames does not require complicated construction. The present invention protects a vehicle and occupants in a vehicle collision. Moreover, such a device would uses a minimum of components, has a low cost of manufacture, and is easy to affix to different location on the vehicle with simple configuration steps. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
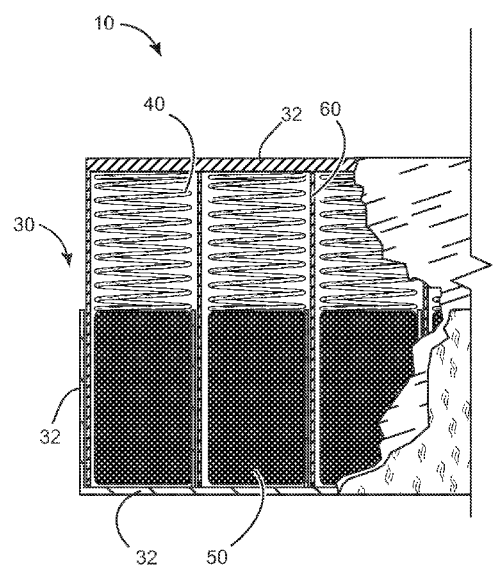
FIG. 1 is a cut-away view of the invention.

The present device (FIG. 1) illustrates a bumper 10 for a vehicle 20 such as a car, truck, trailer, or the like, that may be fixed at different locations on the vehicle 20. The bumper 10 includes a housing 30 that has a pair of interlocking supporting frames 32. One of the supporting frames 32 is fixed to the vehicle body 20. The supporting frame 32 may be made from a rigid plastic material.

The invention further includes a plurality of rebounding means 40 that are each fixed within one of the supporting frames 32 of the housing 30. Each of the rebounding means 40 has a rebounding means spring coefficient. Preferably, each of the rebounding means 40 is segregated from each other rebounding means 40 with a dividing wall 60. Each of the rebounding means 40 may be a spring, such as a coil spring, for example. The dividing wall 60 may be made from a flexible or pliable material.

Figure 2:
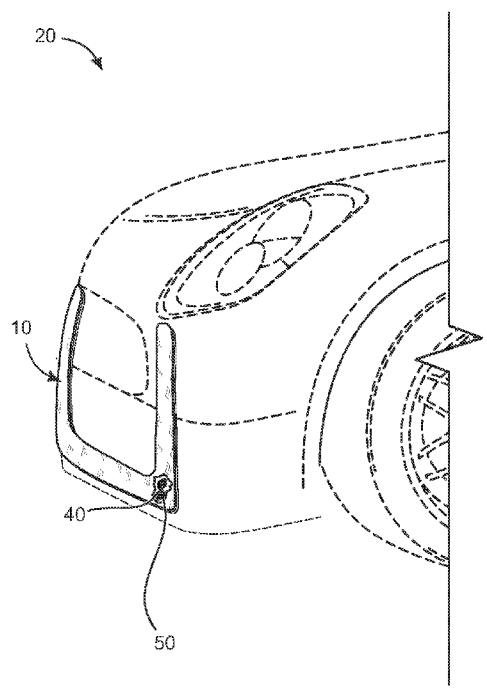
FIG. 2 is a perspective view of the invention, shown partially cut-away.
Figure 6:
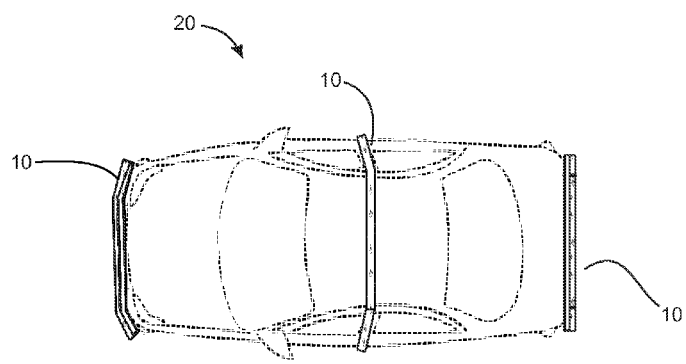
FIG. 6 is a top plan view of the vehicle including the invention.
Figure 3:
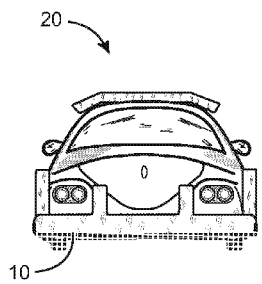
FIG. 3 is a front elevational view of a vehicle including the invention.
Figure 4:
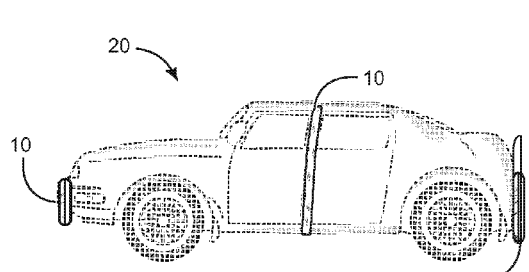
FIG. 4 is a left side elevational view of the vehicle including the invention.
Figure 5:
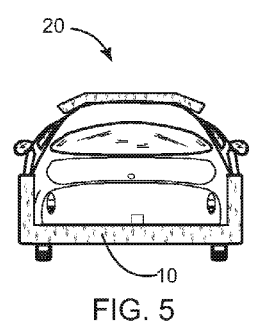
FIG. 5 is a rear elevational view of the vehicle including the invention.
Figure 7:
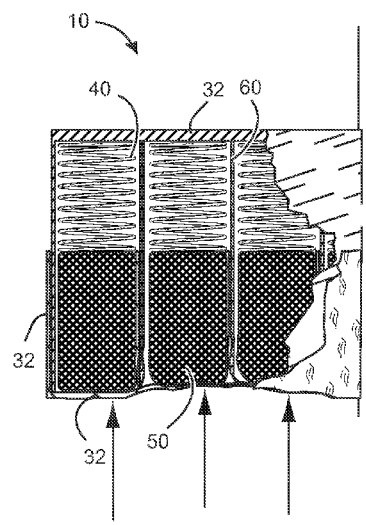
FIG. 7 is a cut-away view of the invention, illustrated at the beginning of a vehicle collision.

The invention further includes a plurality of biasing means 50 that are each fixed within the other one of the supporting frames 32 of the housing 30. Each of the biasing means 50 has a biasing means spring coefficient that is not equal to, and is preferably less than, the rebounding means spring coefficient. Further, each of the biasing means 50 abuts one of the rebounding means 40 (FIG. 2). Ideally, each of the biasing means 50 is segregated from each other biasing means 50 with one of the dividing walls 60. Preferably, each dividing wall 60 is fixed to one of the supporting frames 32. Each of the biasing means 50 may be made from an energy absorbing material, such as a rubber member, for example.

Figure 8:
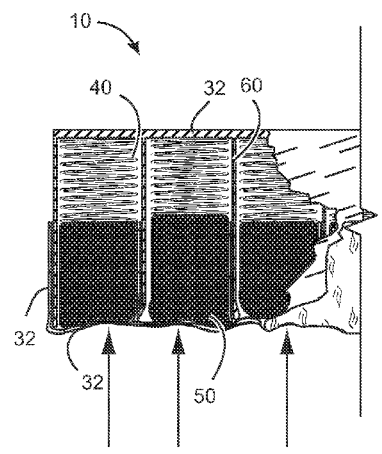
FIG. 8 is a cut-away view of the invention, illustrated with a rebounding means partially compressed.
Figure 9:
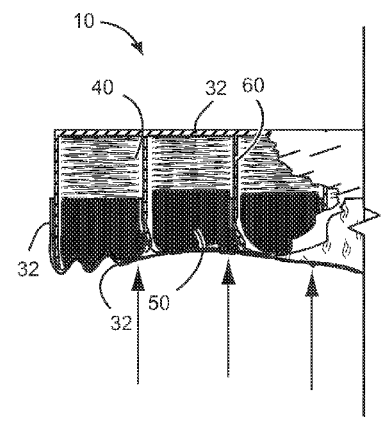
FIG. 9 is a cut-away view of the invention, illustrated with the rebounding means fully compressed and a biasing means partially compressed.
Figure 10:
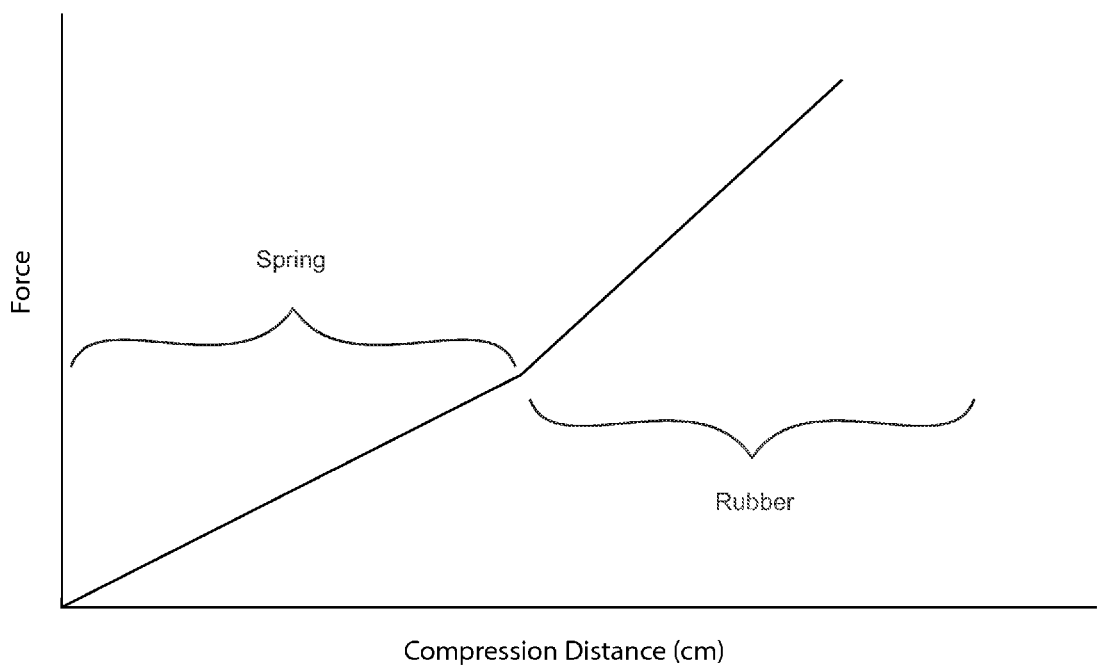
FIG. 10 is a graph illustrating impact force as it relates to compression distance of the invention.

In use, bumper 10 is mounted to various portions of the vehicle 20 as desired, with conventional mounting means (not shown) such as bolts, strong adhesive, or built-into the bumpers while manufacturing the vehicle 20. The interlocking supporting frames 32 of the housing 30 are compressed in a vehicle collision. The plurality of rebounding means 40 together with the plurality of biasing means 50 absorb the collision energy and are each compressed at different rates. The impact with less collision energy collapses the rebounding means 40 only (FIG. 8), while an impact with large collision energy may compress the rebounding means 40 completely and further compress the biasing means 50 (FIG. 9).

While a particular form of the invention has been illustrated and described, it will be apparent that various modifications can be made without departing from the spirit and scope of the invention. For example, the rebounding means 40 and the biasing means 50 may be interchanged appositionally as depicted in the drawings. Accordingly, it is not intended that the invention be limited, except as by the appended claims.

What is claimed is:

1. An energy-absorbing bumper for a vehicle comprising:
    a housing that includes a pair of interlocking supporting frames, one of the supporting frames being fixed to the vehicle;
    a plurality of rebounding means fixed within one of the supporting frames of the housing, each rebounding means having a rebounding means spring coefficient; and
    a plurality of biasing means fixed within the other one of the supporting frames of the housing, each biasing means having a biasing means spring coefficient not equal to the rebounding means spring coefficient, each of the biasing means abutting one of the rebounding means;
    whereby when the interlocking supporting frames of the housing are compressed in a vehicle collision, the plurality of rebounding means together with the plurality of biasing means absorb the collision energy and are compressed at differing rates.

2. The energy-absorbing bumper of claim 1 wherein each rebounding means is segregated from each other rebounding means with a dividing wall.

3. The energy-absorbing bumper of claim 2 wherein each dividing wall is fixed to one of the supporting frames.

4. The energy-absorbing bumper of claim 1 wherein each of biasing means is segregated from each other biasing means with one of the dividing walls.

5. The energy-absorbing bumper of claim 4 wherein each dividing wall is fixed to one of the supporting frames.

6. The energy-absorbing bumper of claim 1 wherein each rebounding means is a spring.

7. The energy-absorbing bumper of claim 6 wherein each spring is a coil spring.

8. The energy-absorbing bumper of claim 1 wherein each biasing means is made from an energy absorbing material.

* * * * *